(12) United States Patent
Peng et al.

(10) Patent No.: US 11,971,834 B2
(45) Date of Patent: *Apr. 30, 2024

(54) INTERCONNECT FOR DIRECT MEMORY ACCESS CONTROLLERS

(71) Applicant: Microsoft Technology Licensing, LLC, Redmond, WA (US)

(72) Inventors: Ruihua Peng, San Jose, CA (US); Monica Man Kay Tang, Santa Clara, CA (US); Xiaoling Xu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,556

(22) Filed: Mar. 13, 2023

(65) Prior Publication Data
US 2023/0214342 A1 Jul. 6, 2023

Related U.S. Application Data

(63) Continuation of application No. 17/086,010, filed on Oct. 30, 2020, now Pat. No. 11,604,748.

(51) Int. Cl.
*G06F 13/28* (2006.01)
*G06F 13/16* (2006.01)
*G06F 13/40* (2006.01)
*G06F 15/173* (2006.01)
*G06F 15/78* (2006.01)

(52) U.S. Cl.
CPC .......... *G06F 13/28* (2013.01); *G06F 13/1689* (2013.01); *G06F 13/4068* (2013.01); *G06F 15/17375* (2013.01); *G06F 15/7825* (2013.01)

(58) Field of Classification Search
None
See application file for complete search history.

(56) References Cited

U.S. PATENT DOCUMENTS

| | | | |
|---|---|---|---|
| 6,209,042 B1 * | 3/2001 | Yanagisawa | G06F 13/28 710/2 |
| 6,615,282 B1 * | 9/2003 | Futral | G06F 13/385 710/39 |
| 7,640,374 B2 * | 12/2009 | Tomozaki | G06F 13/28 710/22 |
| 9,195,621 B2 * | 11/2015 | Xu | G06F 13/1631 |
| 2012/0036289 A1 * | 2/2012 | Go | G06F 13/28 710/23 |
| 2018/0329841 A1 * | 11/2018 | Maeda | G06F 13/1631 |
| 2019/0250982 A1 * | 8/2019 | Fujita | G06F 11/1004 |

* cited by examiner

*Primary Examiner* — Elias Mamo
(74) *Attorney, Agent, or Firm* — Alleman Hall & Tuttle LLP

(57) ABSTRACT

A computing device is provided, including a plurality of memory devices, a plurality of direct memory access (DMA) controllers, and an on-chip interconnect. The on-chip interconnect may be configured to implement control logic to convey a read request from a primary DMA controller of the plurality of DMA controllers to a source memory device of the plurality of memory devices. The on-chip interconnect may be further configured to implement the control logic to convey a read response from the source memory device to the primary DMA controller and one or more secondary DMA controllers of the plurality of DMA controllers.

20 Claims, 9 Drawing Sheets

INTERCONNECT FOR DIRECT MEMORY ACCESS CONTROLLERS

CROSS REFERENCE TO RELATED APPLICATIONS

This application is a continuation of U.S. patent application Ser. No. 17/086,010, filed Oct. 30, 2020, the entirety of which is hereby incorporated herein by reference for all purposes.

BACKGROUND

System-on-a-chip (SOC) architectures have become increasingly common as demand for high-performance computing has grown. In an SOC architecture, data processing and storage capabilities are provided together in an integrated circuit rather than being provided in separate integrated circuits connected to the motherboard of a computing device. By combining processing and memory functionality into an SOC, computations may be performed more quickly as a result of not having to transfer data through the motherboard. In addition, using an SOC may allow the size and power consumption of the computing device to be reduced.

SUMMARY

According to one aspect of the present disclosure, a computing device is provided, including a plurality of memory devices, a plurality of direct memory access (DMA) controllers, and an on-chip interconnect. The on-chip interconnect may be configured to implement control logic to convey a read request from a primary DMA controller of the plurality of DMA controllers to a source memory device of the plurality of memory devices. The on-chip interconnect may be further configured to implement the control logic to convey a read response from the source memory device to the primary DMA controller and one or more secondary DMA controllers of the plurality of DMA controllers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
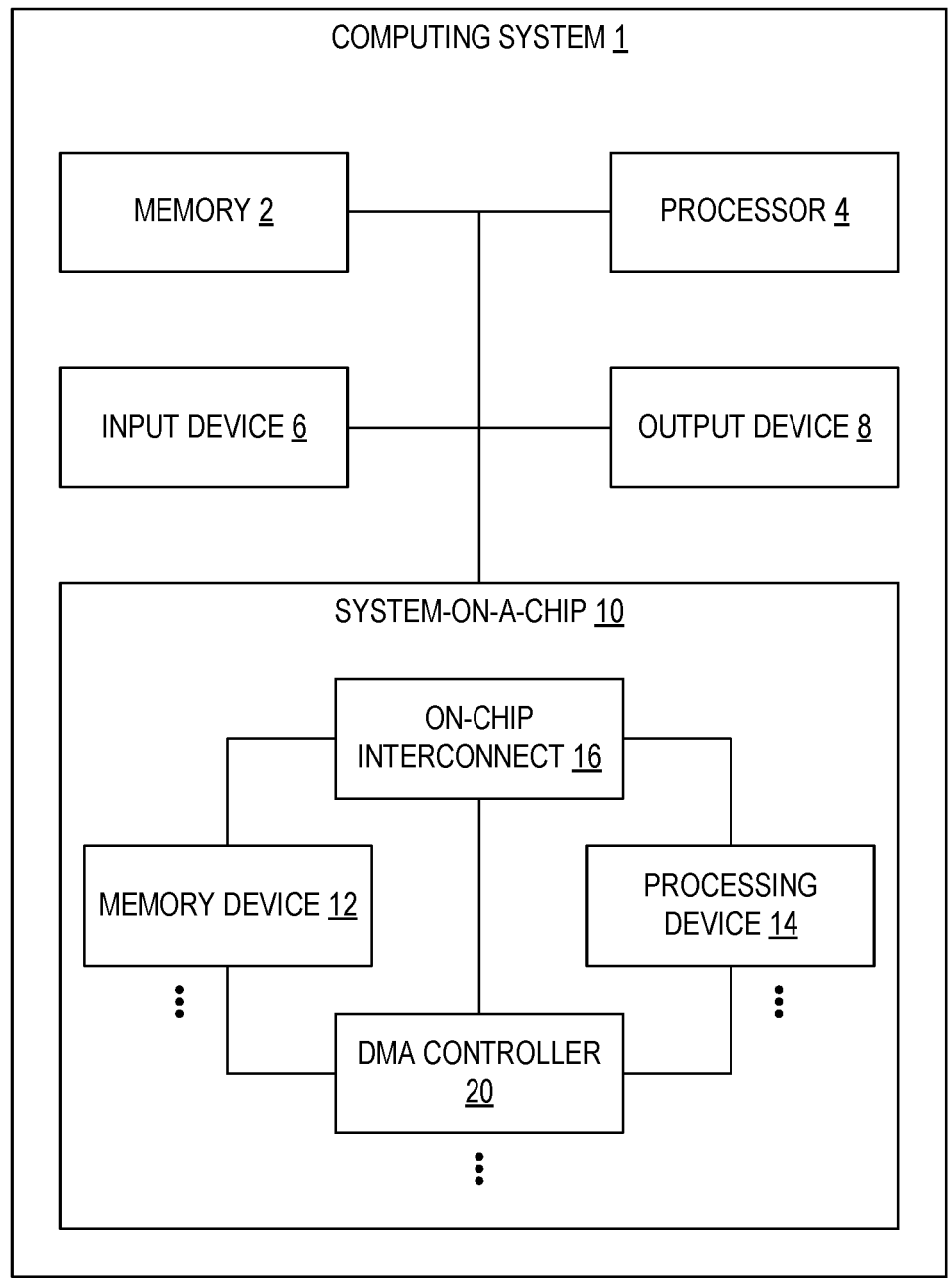
FIG. 1 schematically shows an example computing system including a system on a chip (SOC), according to one example embodiment.

FIG. 1 shows an example computing system 1 in which a computing device in the form of an SOC 10 may be included. In addition to the SOC 10, the computing system may include memory 2, one or more processors 4, one or more input devices 6, one or more output devices 8, and/or one or more other components. The components of the computing system 1 may, for example, be electrically coupled over a motherboard. In addition, the computing system 1 may be communicatively coupled to one or more other computing systems via the one or more input devices 6 and/or the one or more output devices 8. For example, the computing system 1 may be included in a data center in which data processing and storage are performed at a plurality of interconnected computing systems.

The SOC 10 may include a plurality of memory devices 12. For example, the SOC 10 may include one or more memory devices 12 that function as dynamic random-access memory (DRAM) and one or more memory devices 12 that function as static random-access memory (SRAM). Memory devices 12 may include other types of random access memory, as well. In addition, the SOC 10 may include one or more processing devices 14. Each processing device 14 of the one or more processing devices 14 may, for example, be a central processing unit (CPU), a core of a CPU, a graphics processing unit (GPU), a core of a GPU, a field-programmable gate array (FPGA), or an application-specific integrated circuit (ASIC).

The plurality of memory devices 12 may be coupled to the one or more processing devices 14 by an on-chip interconnect 16 via which data may be transferred. The on-chip interconnect 16 may, for example, be a network-on-chip (NoC), a crossbar, or a ring network. In other examples, other network topologies may be used to couple the plurality of memory devices 12 to the plurality of processing devices 14. In examples in which the on-chip interconnect 16 is an NoC, the on-chip interconnect 16 may include one or more routers configured to implement packet switching. In examples in which the on-chip interconnect 16 is a crossbar, the on-chip interconnect 16 may include, for each of the one or more processing devices 14, a plurality of electrical traces coupling that processing device 14 to each of the plurality of memory devices 12.

Figure 2:
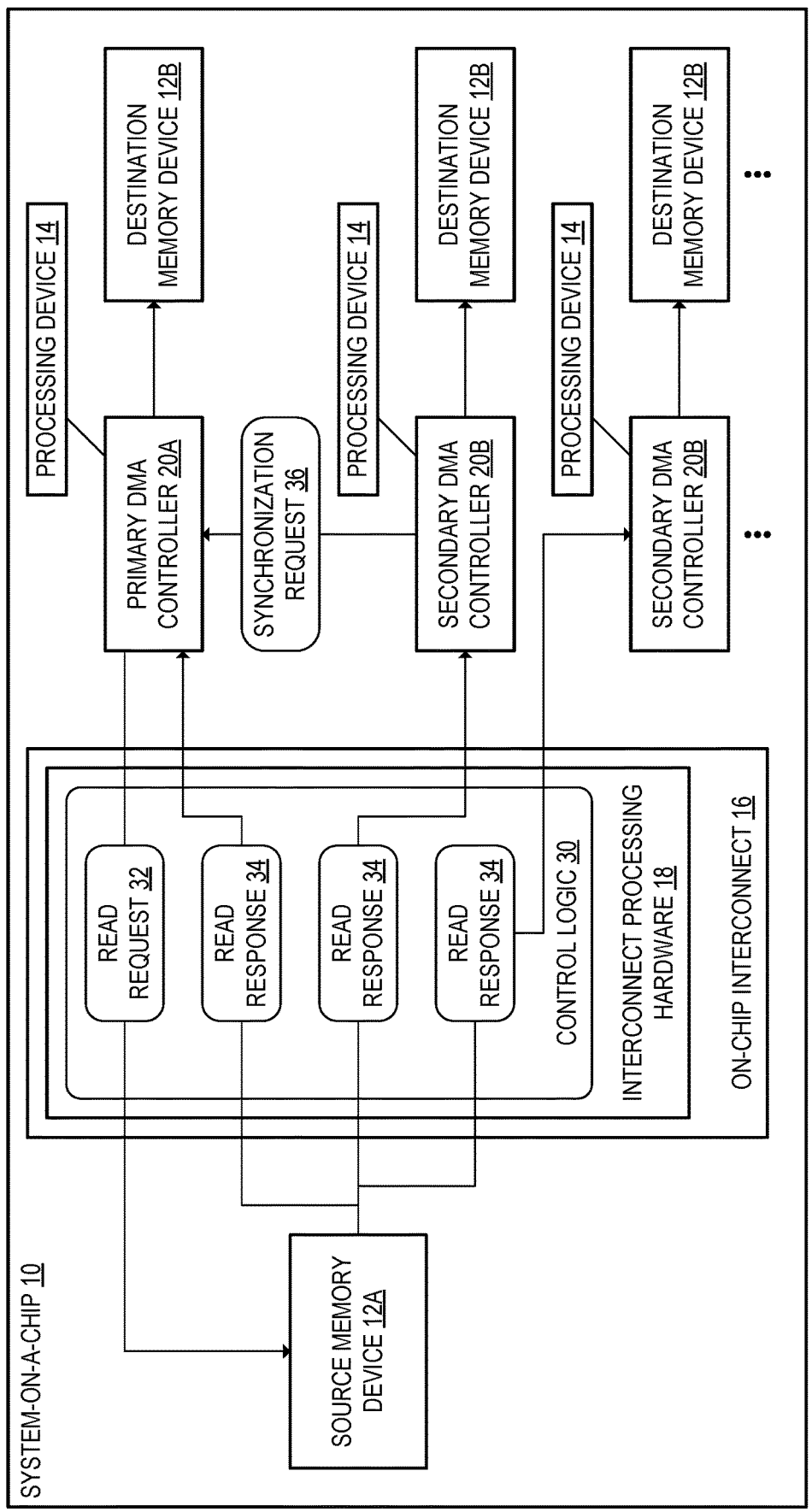
FIG. 2 schematically shows the SOC of FIG. 1 when a read request and a plurality of read responses are transmitted over an on-chip interconnect.

The SOC 10 may further include a plurality of direct memory access (DMA) controllers 20, which may be coupled to the plurality of memory devices 12, the one or more processing devices 14, and the on-chip interconnect 16. Turning now to FIG. 2, in which the SOC 10 is shown in additional detail, the SOC 10 may include a primary DMA controller 20A and one or more secondary DMA controllers 20B. The plurality of DMA controllers 20 may each be configured to transfer data to and from the memory devices 12 of the SOC 10. The DMA controllers 20 may each be configured to transfer data from a source memory device 12A to a destination memory device 12B, as discussed in further detail below. In addition, as shown in the example of FIG. 2, each DMA controller 20 of the plurality of DMA controllers 20 may be communicatively coupled to a respective processing device 14 of a plurality of processing devices 14 included in the SOC 10. Thus, the plurality of DMA controllers 20 may be configured to transfer data between the plurality of memory devices 12 and the plurality of processing devices 14 as well as between one or more source memory devices 12A and one or more destination memory devices 12B.

In existing SOCs, a coherent fabric or a chip-level cache is typically used when transferring data between components of the SOC. A coherent fabric is an on-chip interconnect that is configured to implement snooping logic for the plurality of DMA controllers. The snooping logic may be implemented when a secondary DMA controller requests data from the source memory. In response to receiving a read request for data from the source memory, the coherent fabric may implement the snooping logic by querying the destination memory of the primary DMA controller to determine whether the destination memory of the primary DMA controller stores the requested data. When the destination memory of the primary DMA controller includes the requested data, the requested data may be copied into the destination memory of the secondary DMA controller via the coherent fabric. Thus, cache coherency between the respective destination memory devices of the primary DMA controller and the secondary DMA controller may be maintained. However, implementing snooping logic may be slow and computationally expensive.

Existing SOCs may alternatively use a chip-level cache (e.g. a level 2 or level 3 cache) coupled to the on-chip interconnect. Whenever a DMA controller receives data from the source memory, the chip-level cache may be updated to include the received data. When another DMA requests the same data from the source memory, that data may instead be read from the chip-level cache. However, updating the chip-level cache increases the computational cost of operating the SOC and requires the SOC to include an additional hardware component.

In order to address the above issues with existing methods of transferring data to DMA controllers in an SOC, the on-chip interconnect 16 of the SOC 10 may be configured to implement control logic 30 as discussed below for the primary DMA controller 20A and the one or more secondary DMA controllers 20B to implement a read broadcast or a read multi-cast via one of several possible techniques. The control logic 30 is program logic encoded in software instructions (e.g. firmware instructions) executed by interconnect processing hardware 18 included in the on-chip interconnect 16 to control the exchange of messages through the on-chip interconnect 16. For example, when the on-chip interconnect 16 implements the control logic 30, the on-chip interconnect 16 may be configured to convey a read request 32 from the primary DMA controller 20A to the source memory device 12A. The read request 32 may be generated at the primary DMA controller 20A and may be a request to copy specific data stored at the source memory device 12A to one or more destination memory devices 12B included in the SOC 10.

In some examples, a secondary DMA controller 20B of the one or more secondary DMA controllers 20B may be configured to transmit a synchronization request 36 to the primary DMA controller 20A. The synchronization request 36 may be transmitted to the primary DMA controller 20A via the on-chip interconnect 16. In such examples, the on-chip interconnect 16 may be configured to implement the control logic 30 to convey the read request 32 from the primary DMA controller 20A to the source memory device 12A in response to the primary DMA controller 20A receiving the synchronization request 36. Thus, the secondary DMA controller 20B may be configured to request synchronization between data stored in its destination memory device 12B and the destination memory device 12B associated with the primary DMA controller 20A.

Figure 3:
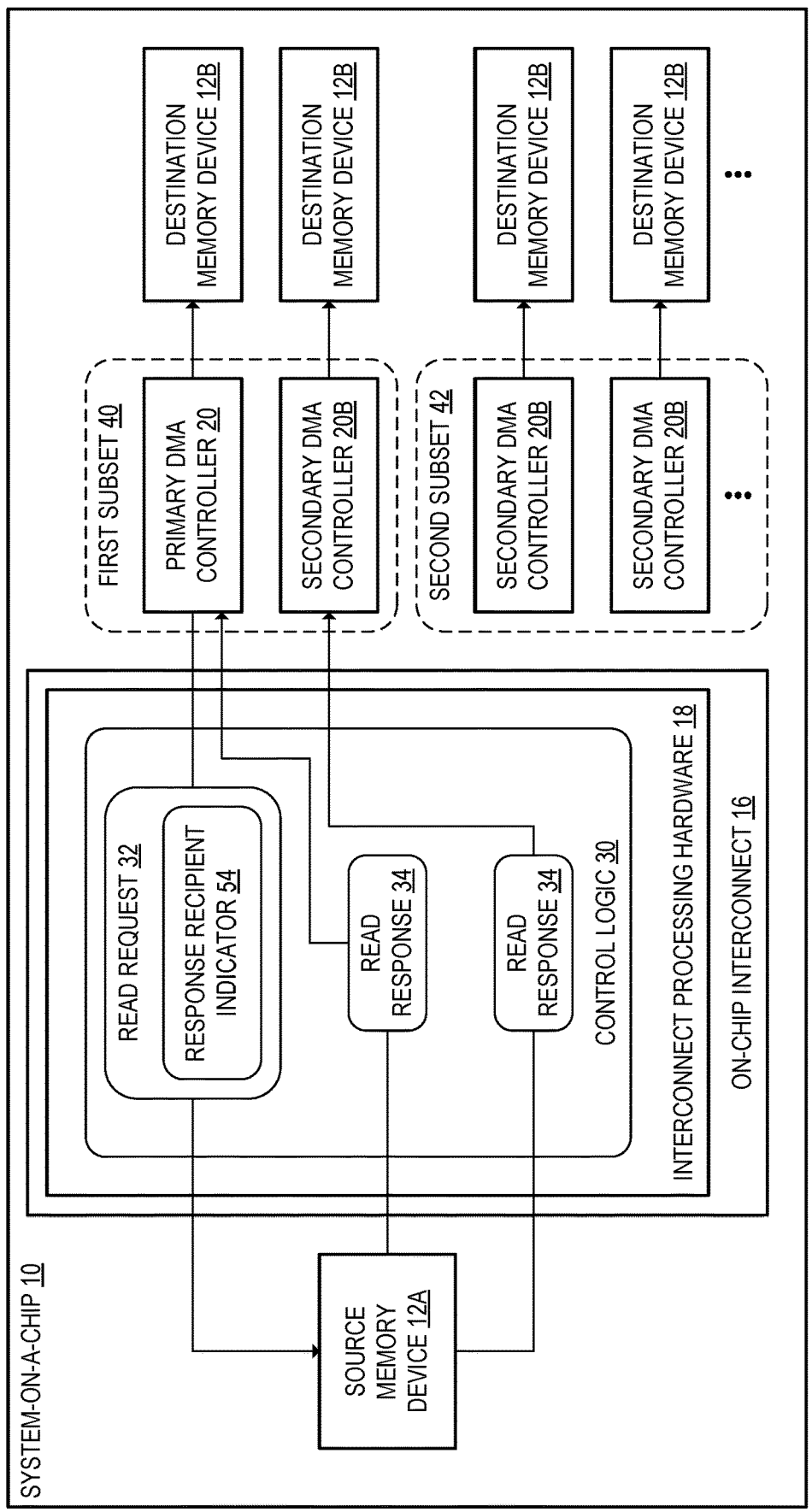
FIG. 3 schematically shows the SOC of FIG. 1 when a plurality of read receipts are respectively conveyed to a first subset of a plurality of direct memory access (DMA) controllers but not to a second subset of the plurality of DMA controllers.

At the source memory device 12A, the SOC 10 may be configured to generate a read response 34 based at least in part on the read request 32. When the on-chip interconnect 16 implements the control logic 30, the on-chip interconnect 16 may be further configured to convey the read response 34 from the source memory device 12A to the primary DMA controller 20A and one or more secondary DMA controllers 20B of the plurality of DMA controllers 20. In some examples, the on-chip interconnect 16 may be configured to convey the read response 34 to each DMA controller 20 of the plurality of DMA controllers 20 included in the SOC 10. Alternatively, as shown in FIG. 3, the on-chip interconnect 16 may be configured to convey the read response 34 to a first subset 40 of the plurality of DMA controllers 20 and not convey the read response 34 to a second subset 42 of the plurality of DMA controllers 20.

As discussed above, the plurality of memory devices 12 may further include a plurality of destination memory devices 12B respectively coupled to the plurality of DMA controllers. Subsequently to receiving the read response 34, the primary DMA controller 20A and the one or more secondary DMA controllers 20B may each be configured to write data included in the read response 34 to their corresponding destination memory devices 12B. In this way, the data that has been read from the source memory device 12A is not only communicated to the primary DMA controller 20A that requested the data, but also to other DMA controllers 20 using a read broadcast or multi-cast approach. Therefore, each of the destination memory devices 12B may keep a coordinated and up-to-date memory cache without requiring a separate chip level cache or snooping logic.

Figure 4:
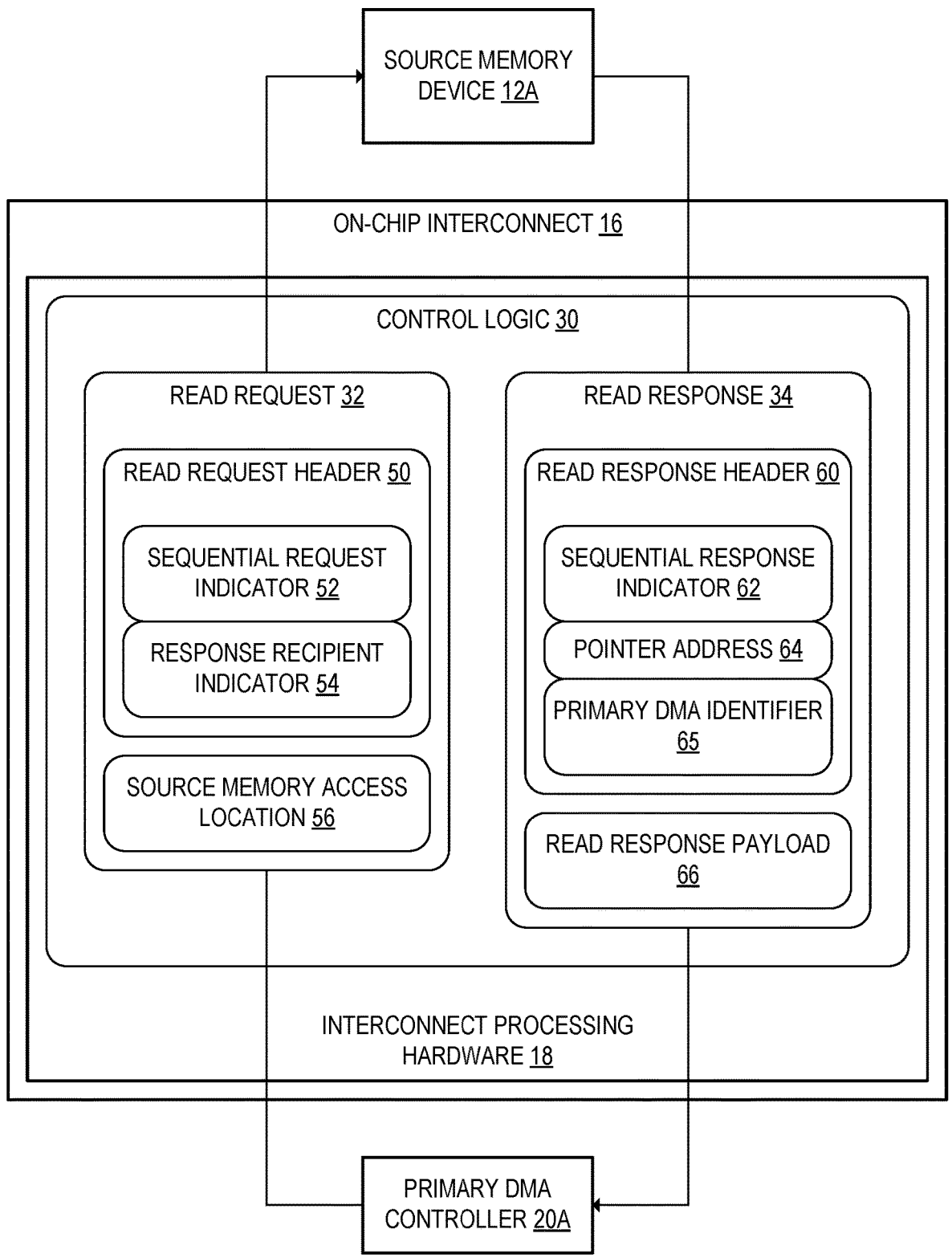
FIG. 4 schematically shows a read request and a read response, according to the embodiment of FIG. 1.

FIG. 4 schematically shows information that may be included in the read request 32 and the read response 34. In the example of FIG. 4, the on-chip interconnect 16 is shown when a read request 32 is transmitted from the primary DMA controller 20A to the source memory device 12A and when a read response 34 is transmitted from the source memory device 12A to the primary DMA controller 20A. As shown in FIG. 4, the read request 32 may include read request header 50, which may include a sequential request indicator 52 and a response recipient indicator 54. The sequential request indicator 52, may, for example, be a timestamp or a sequentially assigned identification number for the read request 32. The response recipient indicator 54 may indicate the first subset 40 of the plurality of DMA controllers 20 to which the read response 34 is configured to be conveyed. For example, the response recipient indicator 54 may include a corresponding bit for each DMA controller 20 included in the SOC 10 that indicates whether that DMA controller 20 is configured to receive the read response 34. Thus, the sequential request indicator 52 and the response recipient indicator 54 may form response multicast metadata that identifies both the read request 32 and the plurality of DMA controllers 20 that are configured to receive a read response 34. In addition to the read request header 50, the read request 32 may further include a source memory access location 56, which may be a pointer to a location in the source memory device 12A.

The example read response 34 shown in FIG. 4 may include a read response header 60 and a read response payload 66. The read response header 60 may include metadata for the read response 34, and the read response payload 66 may include the data received from the source memory device 12A in response to the read request 32. The read response header 60 may include a sequential response indicator 62, which may, for example, be a timestamp or a sequentially assigned identification number. In addition, the read response header 60 may include a pointer address 64 indicating a location in the destination memory device 12B to which the DMA controller 20 that receives the read response 34 may be configured to write the read response payload 66. In some examples, the read response header 60 of the read response 34 may further include a primary DMA identifier 65 that indicates which DMA controller 20 of the plurality of DMA controllers 20 is the primary DMA controller 20A that initiated the read request 32 with which the read response 34 is associated. The read response 34 may be identified as being associated with the read request 32 by, in some examples, including the sequential request indicator 52 as well as the sequential response indicator 62 in the read response header 60. Alternatively, the state of the read request 32 and the read response 34 may be monitored at an agent executed at the processing device 14 of the primary DMA controller 20A.

Figure 5:
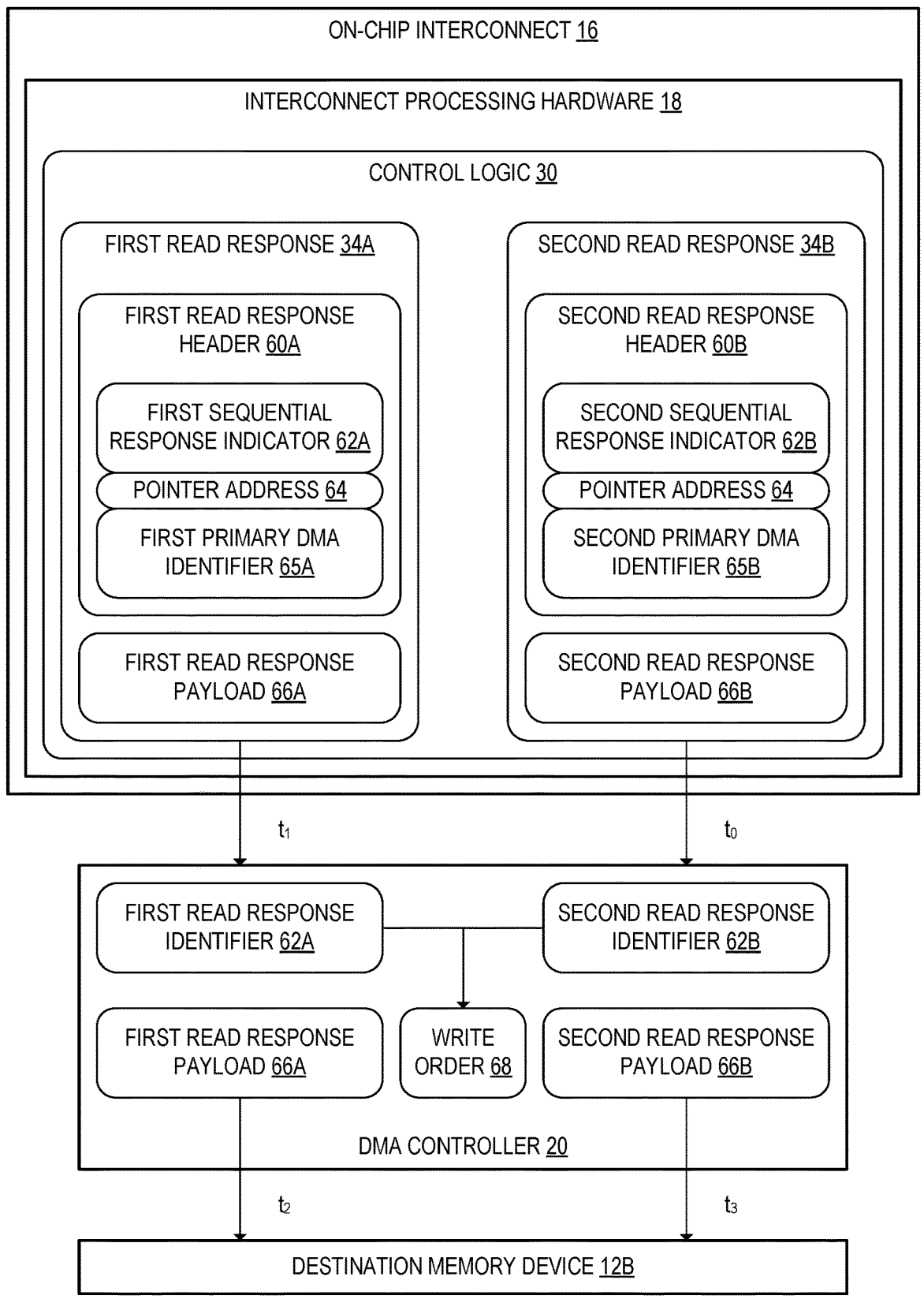
FIG. 5 schematically shows a first read response and a second read response received at a DMA controller, according to the embodiment of FIG. 1.

As shown in the example of FIG. 5, at least one DMA controller 20 of the plurality of DMA controllers 20 may be configured to receive a plurality of read responses 34. In the example of FIG. 5, a DMA controller 20 receives a first read response 34A at a time t0 and a second read response 34B at a time $t_1$. The first read response 34A has a first sequential response indicator 62A included in a first read response header 60A, and further includes a first primary DMA identifier 65A and a first read response payload 66A. The second read response 34B has a second sequential response indicator 62B included in a second read response header 60B, and further includes a second primary DMA identifier 65B and a second read response payload 66B. In some examples, the on-chip interconnect 16 may be configured to transmit a plurality of read responses to the primary DMA controller 20A and the one or more secondary DMA controllers 20B in some order other than the order in which the corresponding plurality of read requests 32 were received. In order for the respective read response payloads 66 of the plurality of read responses 34 to be written to the destination memory device 12B in the correct order, the on-chip interconnect 16 may be configured to determine a write order 68 indicated by the respective sequential response indicators 62 of the plurality of read responses 34. The DMA controller 20 may then write the respective read response payloads 66 of the plurality of read responses 34 to the corresponding destination memory device 12B of the DMA controller 20 as specified by the write order 68. In the example of FIG. 5, although the first read response 34A is received prior to the second read response 34B, the on-chip interconnect 16 is configured to compute a write order 68 in which the second read response payload 66B is written to the destination memory device 12B at time $t_2$ before the first read response payload 66A is written to the destination memory device 12B at time $t_3$. For example, when the sequential response indicators 62 of the plurality of read responses 34 are sequentially ordered numbers, the on-chip interconnect 16 may compute the write order 68 such that the plurality of read responses 34 are written to the destination memory device 12B in ascending sequential response indicator order.

Figure 6:
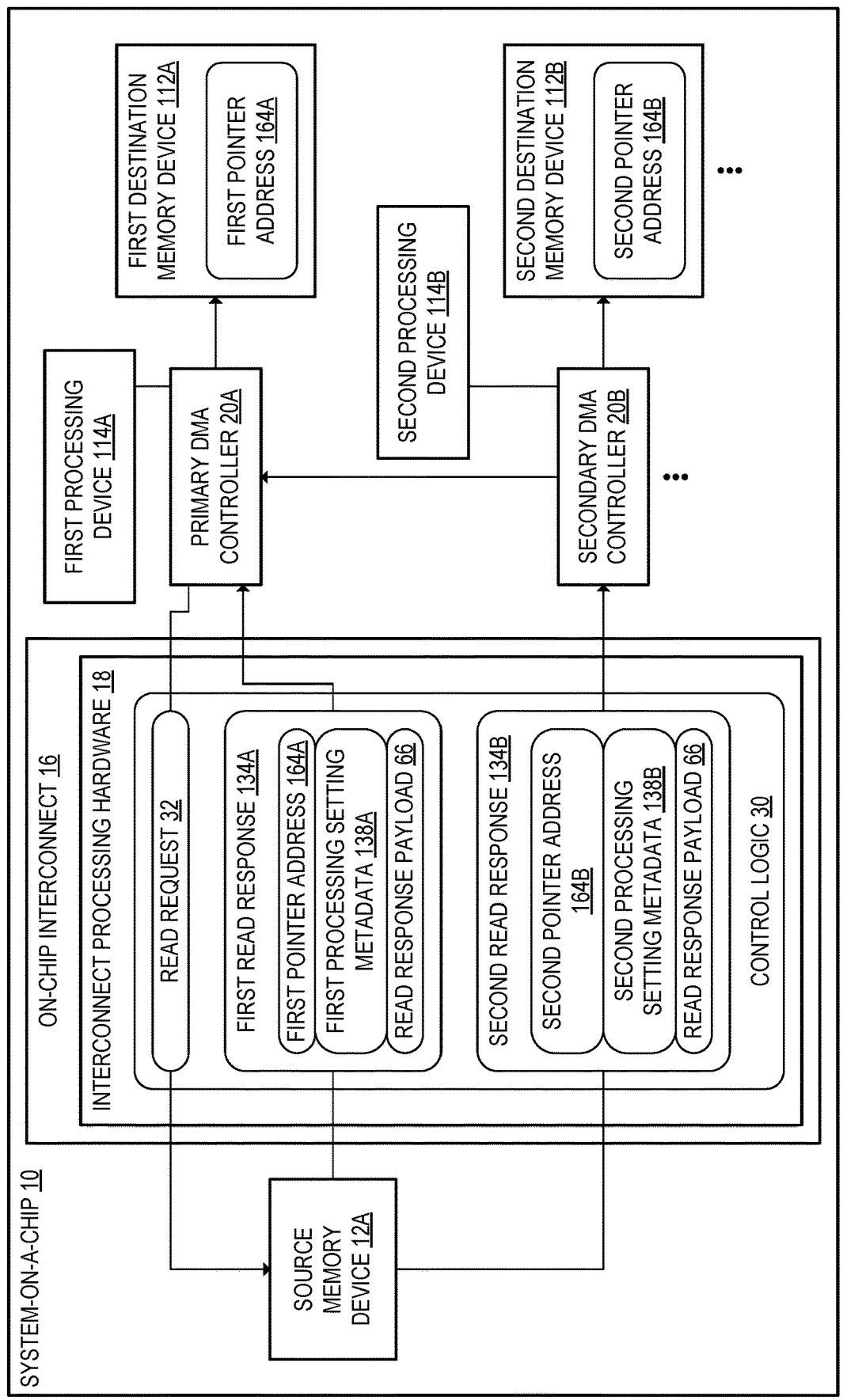
FIG. 6 schematically shows a first read response including a first pointer address and a second read response including a second pointer address, according to the embodiment of FIG. 1.

In some examples, the plurality of DMA controllers 20 may be configured to write the data included in the read response 34 to a plurality of different respective pointer addresses 64 at their corresponding destination memory devices 12B. As shown in the example of FIG. 6, the primary DMA controller 20A is configured to receive a first read response 134A including a first pointer address 164A. Similarly, the secondary DMA controller 20B is configured to receive a second read response 134B including a second pointer address 164B. Subsequently to receiving the first read response 134A, the primary DMA controller 20A may be further configured to write the read response payload 66 included in the first read response 134A to the first pointer address 164A of a first destination memory device 112A coupled to the primary DMA controller 20A. In addition, subsequently to receiving the second read response 134B, the secondary DMA controller 20B may be further configured to write the read response payload 66 included in the second read response 134B to the second pointer address 164B of a second destination memory device 112B coupled to the secondary DMA controller 20B. As a result of writing the read response payload 66 to different pointer addresses in the first destination memory device 112A and the second destination memory device 112B, different memory allocation schemes may be used at the first destination memory device 112A and the second destination memory device 112B. Thus, more efficient memory allocation may be achieved.

As shown in FIG. 6, the primary DMA controller 20A may be coupled to a first processing device 114A, and the secondary DMA controller 20B may be coupled to a second processing device 114B. In some examples, when the primary DMA controller 20A and the secondary DMA controller 20B respectively receive the first read response 134A and the second read response 134B, the primary DMA controller 20A and the secondary DMA controller 20B may be further configured to load the read response payload 66 into the first processing device 114A and the second processing device 114B respectively. In such examples, the first read response 134A and the second read response 134B may respectively include first processing setting metadata 138A and second processing setting metadata 138B. The first processing setting metadata 138A and the second processing setting metadata 138B may include settings with which the first processing device 114A and the second processing device 114B may be configured to perform one or more computations on read response payload 66. In some examples, the first processing setting metadata 138A and the second processing setting metadata 138B may indicate one or more respective preprocessing steps that may be performed on the read response payload prior to writing the read response payload to the first destination memory device 112A and the second destination memory device 112B. The one or more preprocessing steps may, for example, be one or more steps of a compression operation or an encryption operation.

Figure 7A:
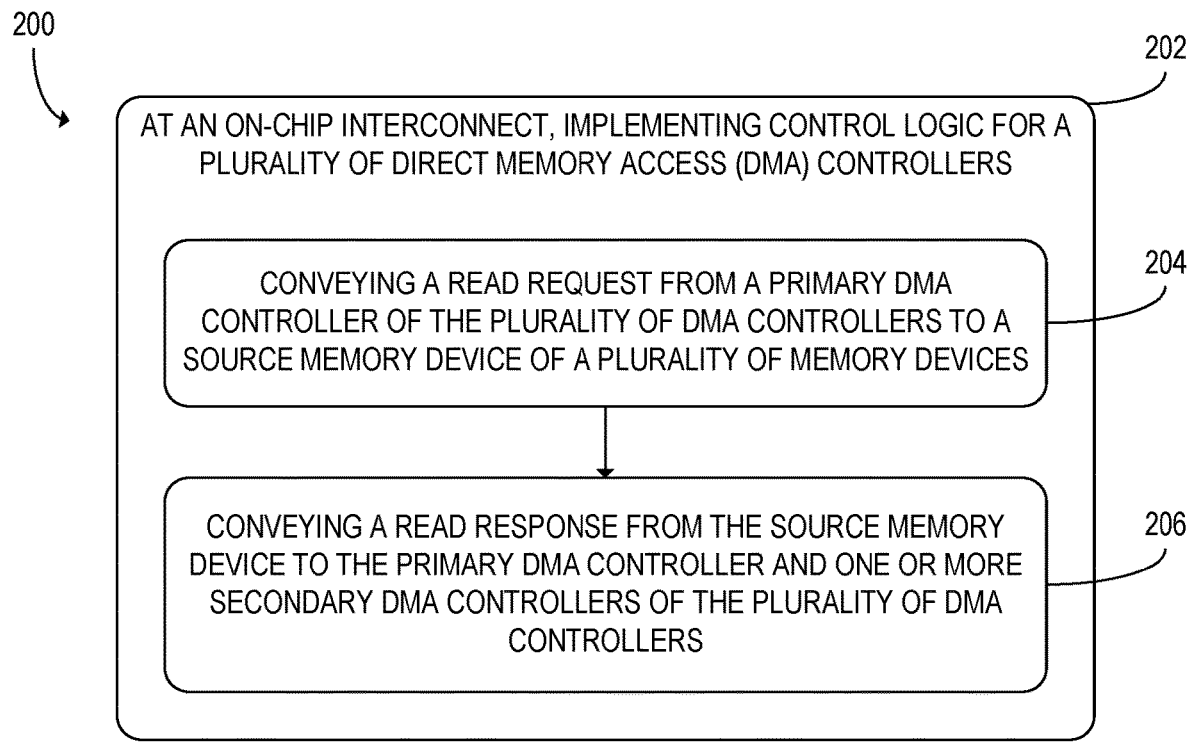
FIG. 7A shows a flowchart of a method for use with a computing device, according to the embodiment of FIG. 1.

FIG. 7A shows a flowchart of an example method 200 for use with a computing device. The computing device at which the method 200 is performed may be an SOC, such as the SOC 10 of FIG. 1. At step 202, the method 200 may include implementing control logic at an on-chip interconnect for a plurality of DMA controllers. The on-chip interconnect may, for example, be an NoC, a crossbar, or a ring network. The plurality of DMA controllers may be configured to perform direct memory access for a plurality of memory devices included in the SOC. The plurality of memory devices may include a source memory device, which may be an SRAM device, and a plurality of destination memory devices, which may be a plurality of DRAM devices respectively coupled to the plurality of DMA controllers. In addition, the plurality of DMA controllers may be respectively coupled to a plurality of processing devices. Each processing device of the plurality of processing devices may, for example, be a CPU, a core of a CPU, a GPU, a core of a GPU, an FPGA, or an ASIC.

Step 202 may include, at step 204, conveying a read request from a primary DMA controller of the plurality of DMA controllers to the source memory device of the plurality of memory devices. The read request may be generated at the primary DMA and may be a request to transmit data stored at the source memory device to a plurality of destination memory devices via the on-chip interconnect and two or more of the plurality of DMAs.

Figure 7B:
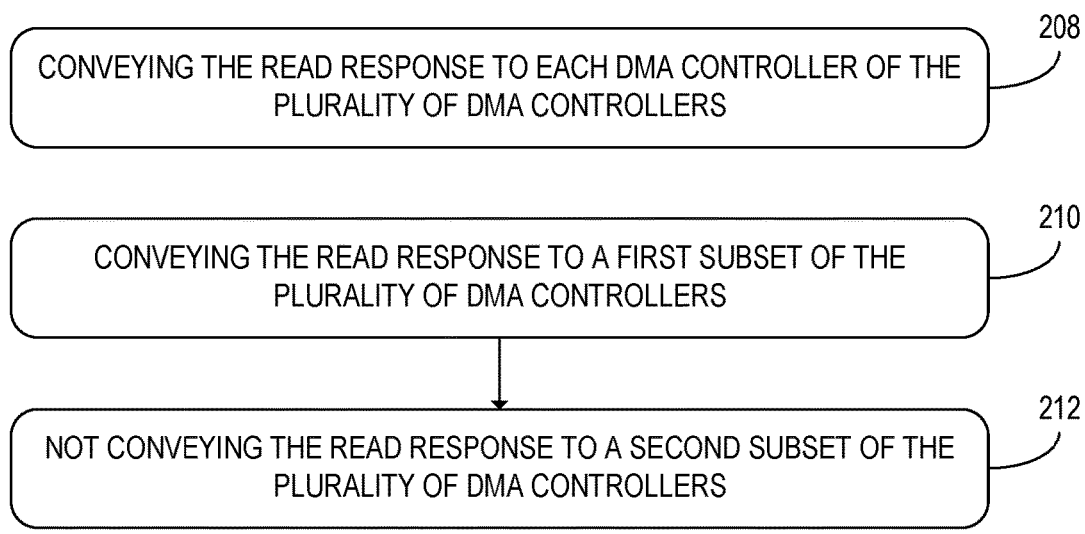
FIG. 7B-7D show additional steps of the method of FIG. 7A that may be performed in some examples.

At step 206, step 202 may further include conveying a read response from the source memory device to the primary DMA controller and one or more secondary DMA controllers of the plurality of DMA controllers. FIG. 7B shows additional steps of the method 200 that may be performed when performing step 206. As shown in FIG. 7B at step 208, conveying the read response to the primary DMA controller and the one or more secondary DMA controllers at step 206 may, in some examples, include conveying the read response to each DMA controller of the plurality of DMA controllers. Alternatively, as shown at step 210 of FIG. 7B, step 206 may include conveying the read response to a first subset of the plurality of DMA controllers. When step 210 is performed, step 206 may further include, at step 212, not conveying the read response to a second subset of the plurality of DMA controllers. In some examples, the read request may include an indication of which DMA controllers of the plurality of DMA controllers are configured to receive copies of the read response.

Figure 7C:
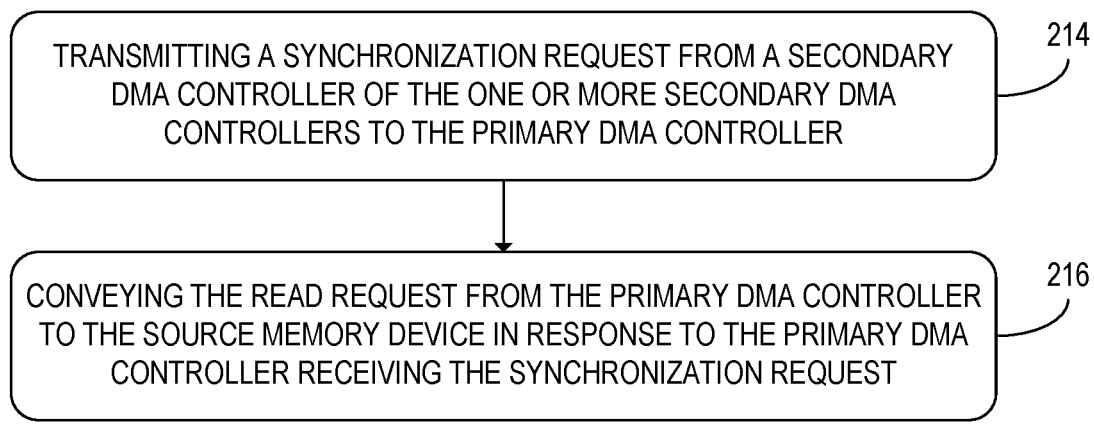

FIG. 7C shows additional steps of the method 200 that may be performed in some examples. At step 214, the method 200 may further include transmitting a synchronization request from a secondary DMA controller of the one or more secondary DMA controllers to the primary DMA controller. The synchronization request may be transmitted via the on-chip interconnect when implementing the control logic at step 202. Step 214 may be performed prior to transmitting the read request to the source memory at step 204. In examples in which step 214 is performed, the method 200 may further include, at step 216, conveying the read request from the primary DMA controller to the source memory device in response to the primary DMA controller receiving the synchronization request. Thus, when the primary DMA controller receives the synchronization request, the primary DMA controller may convey a read request to the source memory to synchronize data stored in the destination memory of the primary DMA controller and the destination memory of the secondary DMA controller.

Figure 7D:
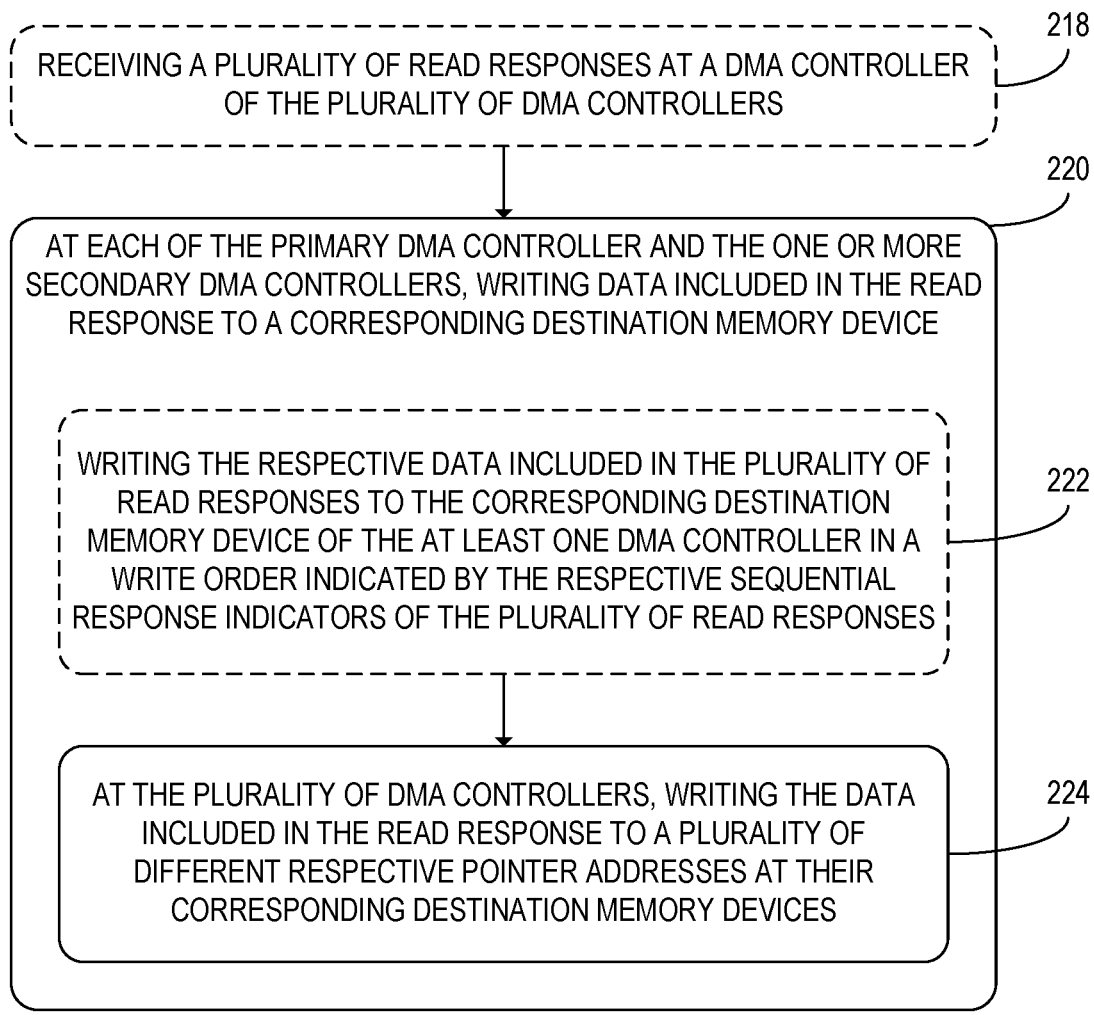

FIG. 7D also shows additional steps of the method 200 that may be performed in some examples. At step 218, the method 200 may include receiving a plurality of read responses at a DMA controller of the plurality of DMA controllers. For example, the DMA controller may be a secondary DMA controller that receives a plurality of read responses associated with read requests it did not originate.

At step 220, the method 200 may further include, at each of the primary DMA controller and the one or more secondary DMA controllers, writing data included in the read response to their corresponding destination memory devices. In some examples, the read response may include a sequential response indicator. The sequential response indicator may be included in a read response header, and may, for example, be a timestamp or a sequentially assigned number.

In examples in which step 218 is performed and the read response includes a sequential response indicator, step 220 may include, at step 222, writing the respective data included in the plurality of read responses to the corresponding destination memory device of the at least one DMA controller in a write order indicated by the respective sequential response indicators of the plurality of read responses. For example, the write order may be set as a temporal order of respective timestamps included in the plurality of read responses. If the read responses are received at the DMA controller out of temporal order, the read responses may still be written to the destination memory device of the DMA controller in the temporal order in which the read responses were generated.

In some examples, step 220 may further include step 224. Step 224 may include, at the plurality of DMA controllers, writing the data included in the read response to a plurality of different respective pointer addresses at their corresponding destination memory devices. The pointer address for each read response may, for example, be indicated in a header of the read response.

Using the systems and methods discussed above, data stored in the source memory may be shared with the plurality of DMA controllers without using large amounts of source memory read bandwidth. The above systems and methods may also allow the additional hardware complexity and computational costs associated with a coherent fabric or a chip-level cache to be avoided. In addition, since different processing settings or pointer addresses may be used for read responses received at different DMA controllers, the systems and methods discussed above may further allow for increased flexibility in the processing and storage of data included in the read responses received at the DMA controllers.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
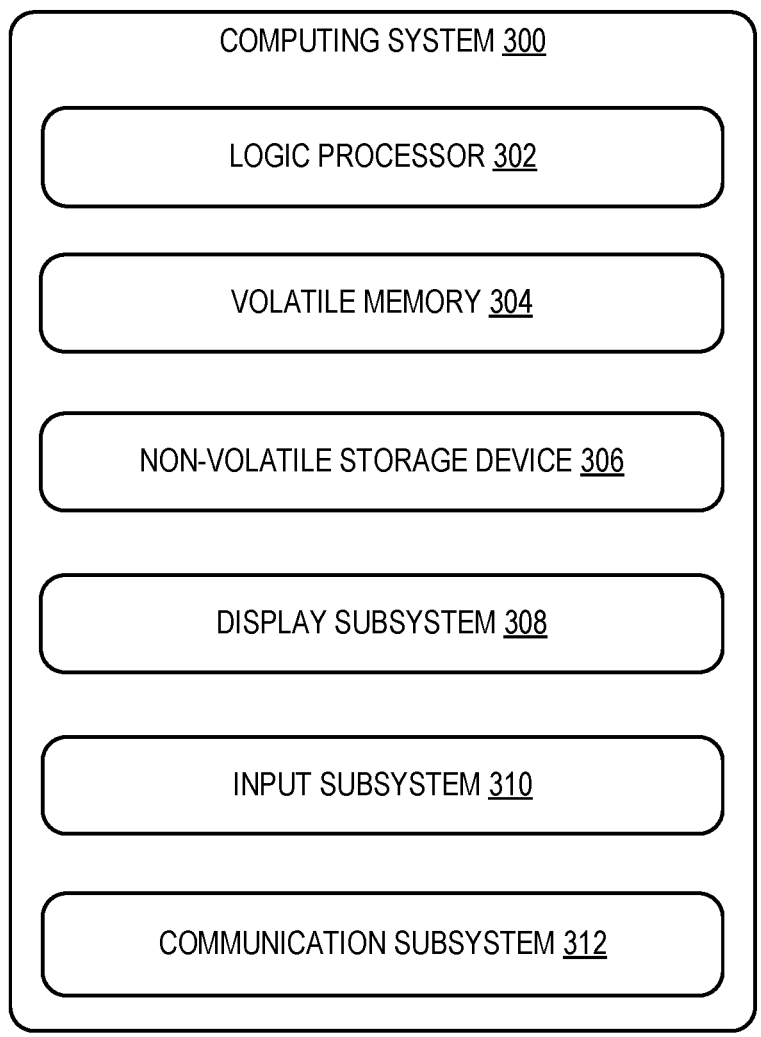
FIG. 8 shows a schematic view of an example computing environment in which the computing system of FIG. 1 may be enacted.

FIG. 8 schematically shows a non-limiting embodiment of a computing system 300 that can enact one or more of the methods and processes described above. Computing system 300 is shown in simplified form. Computing system 300 may embody the computing system 1 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 8.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

The following paragraphs describe several aspects of the present disclosure. According to one aspect of the present disclosure, a computing device is provided, including a plurality of memory devices, a plurality of direct memory access (DMA) controllers, and an on-chip interconnect. The on-chip interconnect may be configured to implement control logic to convey a read request from a primary DMA controller of the plurality of DMA controllers to a source memory device of the plurality of memory devices. The on-chip interconnect may be further configured to implement the control logic to convey a read response from the source memory device to the primary DMA controller and one or more secondary DMA controllers of the plurality of DMA controllers.

According to this aspect, a secondary DMA controller of the one or more secondary DMA controllers may be configured to transmit a synchronization request to the primary DMA controller. The on-chip interconnect may be configured to implement the control logic to convey the read request from the primary DMA controller to the source memory device in response to the primary DMA controller receiving the synchronization request.

According to this aspect, the plurality of memory devices may further include a plurality of destination memory devices respectively coupled to the plurality of DMA controllers. The primary DMA controller and the one or more secondary DMA controllers may each be configured to write data included in the read response to their corresponding destination memory devices.

According to this aspect, at least one DMA controller of the plurality of DMA controllers may be configured to receive a plurality of read responses. The plurality of read responses may include a respective plurality of sequential response indicators.

According to this aspect, the at least one DMA controller of the plurality of DMA controllers may be configured to write the respective data included in the plurality of read responses to the corresponding destination memory device of the at least one DMA controller in a write order indicated by the respective sequential response indicators of the plurality of read responses.

According to this aspect, the plurality of DMA controllers may be configured to write the data included in the read response to a plurality of different respective pointer addresses at their corresponding destination memory devices.

According to this aspect, the on-chip interconnect may be configured to implement the control logic to convey the read response to each DMA controller of the plurality of DMA controllers.

According to this aspect, the on-chip interconnect may be configured to implement the control logic to convey the read response to a first subset of the plurality of DMA controllers and not convey the read response to a second subset of the plurality of DMA controllers.

According to this aspect, the read request may indicate the first sub set of the plurality of DMA controllers to which the read response is configured to be conveyed.

According to this aspect, the computing device may further include a respective plurality of processing devices communicatively coupled to the plurality of DMA controllers. Each processing device of the plurality of processing devices may be a central processing unit (CPU), a core of a CPU, a graphics processing unit (GPU), a core of a GPU, a field-programmable gate array (FPGA), or an application-specific integrated circuit (ASIC).

According to this aspect, the on-chip interconnect may be a network-on-chip (NoC), a crossbar, or a ring network.

According to another aspect of the present disclosure, a method for use with a computing device is provided. The method may include, at an on-chip interconnect, implementing control logic for a plurality of direct memory access (DMA) controllers. The control logic may be implemented at least in part by conveying a read request from a primary DMA controller of the plurality of DMA controllers to a source memory device of a plurality of memory devices. The control logic may be further implemented by conveying a read response from the source memory device to the primary DMA controller and one or more secondary DMA controllers of the plurality of DMA controllers.

According to this aspect, the method may further include transmitting a synchronization request from a secondary DMA controller of the one or more secondary DMA controllers to the primary DMA controller. The method may further include conveying the read request from the primary DMA controller to the source memory device in response to the primary DMA controller receiving the synchronization request.

According to this aspect, the plurality of memory devices may further include a plurality of destination memory devices respectively coupled to the plurality of DMA controllers. The method may further include, at each of the primary DMA controller and the one or more secondary DMA controllers, writing data included in the read response to their corresponding destination memory devices.

According to this aspect, the method may further include receiving a plurality of read responses at a DMA controller of the plurality of DMA controllers. The plurality of read responses may include a respective plurality of sequential response indicators.

According to this aspect, the method may further include, at the DMA controller of the plurality of DMA controllers, writing the respective data included in the plurality of read responses to the corresponding destination memory device of the at least one DMA controller in a write order indicated by the respective sequential response indicators of the plurality of read responses.

According to this aspect, the method may further include, at the plurality of DMA controllers, writing the data included in the read response to a plurality of different respective pointer addresses at their corresponding destination memory devices.

According to this aspect, implementing the control logic may further include conveying the read response to a first subset of the plurality of DMA controllers and not conveying the read response to a second subset of the plurality of DMA controllers.

According to this aspect, the read request may indicate the first subset of the plurality of DMA controllers to which the read response is configured to be conveyed.

According to another aspect of the present disclosure, a computing device is provided, including a plurality of memory devices and a plurality of direct memory access (DMA) controllers including a primary DMA controller and one or more secondary DMA controllers. A secondary DMA controller of the one or more secondary DMA controllers may be configured to transmit a synchronization request to the primary DMA controller. The primary DMA controller may be configured to transmit a read request to a source memory device of the plurality of memory devices in response to receiving the synchronization request. The computing device may further include an on-chip interconnect configured to implement control logic to convey the read request from the primary DMA controller to the source memory device. The on-chip interconnect may be further configured to implement the control logic to convey a read response from the source memory device to the primary DMA controller and the one or more secondary DMA controllers. The primary DMA controller and the one or more secondary DMA controllers may each be configured to write data included in the read response to corresponding destination memory devices of the plurality of memory devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An integrated circuit comprising:
   a plurality of direct memory access (DMA) controllers; and
   an on-chip interconnect configured to implement control logic to:
      convey a read request from a primary DMA controller of the plurality of DMA controllers to a source memory device; and
      broadcast or multi-cast a read response by conveying respective copies of the read response from the source memory device to the primary DMA controller and one or more secondary DMA controllers, each of the primary DMA controller and one or more secondary DMA controllers having a corresponding on-chip destination memory device included in the integrated circuit,
   wherein the primary DMA controller and the one or more secondary DMA controllers are each configured to write data included in the read response to a plurality of different respective pointer addresses at the corresponding on-chip destination memory devices for the respective primary and secondary DMA controllers.

2. The integrated circuit of claim 1, wherein:
   a secondary DMA controller of the one or more secondary DMA controllers is configured to transmit a synchronization request to the primary DMA controller; and
   the on-chip interconnect is configured to implement the control logic to convey the read request from the primary DMA controller to the source memory device in response to the primary DMA controller receiving the synchronization request.

3. The integrated circuit of claim 2, wherein the on-chip interconnect is configured to synchronize respective memory caches of the on-chip destination memory devices by writing the data included in the read response to the on-chip destination memory devices.

4. The integrated circuit of claim 1, wherein the on-chip interconnect is configured to implement the control logic to convey the read response to each DMA controller of the plurality of DMA controllers.

5. The integrated circuit of claim 1, wherein the on-chip interconnect is configured to implement the control logic to convey the read response to a proper subset of the plurality of DMA controllers.

6. The integrated circuit of claim 5, wherein the read request indicates the proper subset of the plurality of DMA controllers to which the read response is configured to be conveyed.

7. The integrated circuit of claim 1, further comprising a respective plurality of processing devices communicatively coupled to the plurality of DMA controllers, wherein each processing device of the plurality of processing devices is a central processing unit (CPU), a core of a CPU, a graphics processing unit (GPU), a core of a GPU, a field-programmable gate array (FPGA), or an application-specific integrated circuit (ASIC).

8. The integrated circuit of claim 7, wherein the read response further includes processing setting metadata that indicates a preprocessing operation that the respective processing devices are configured to apply to the data included in the read response prior to writing to data included in the read response to the destination memory devices.

9. The integrated circuit of claim 7, wherein the preprocessing operation is a compression operation or an encryption operation.

10. The integrated circuit of claim 1, wherein the pointer addresses are included in respective headers of the copies of the read response.

11. A method for use with an integrated circuit that includes a plurality of direct memory access (DMA) controllers and an on-chip interconnect, the method comprising implementing control logic at the on-chip interconnect at least in part by:
    conveying a read request from a primary DMA controller of the plurality of DMA controllers to a source memory device; and
    broadcasting or multi-cast a read response by conveying respective copies of the read response from the source memory device to the primary DMA controller and one or more secondary DMA controllers, each of the primary DMA controller and one or more secondary DMA controllers having a corresponding on-chip destination memory device included in the integrated circuit,
    wherein the primary DMA controller and the one or more secondary DMA controllers are each configured to write data included in the read response to a plurality of different respective pointer addresses at the corresponding on-chip destination memory devices for the respective primary and secondary DMA controllers.

12. The method of claim 11, further comprising:
    at a secondary DMA controller of the one or more secondary DMA controllers, transmitting a synchronization request to the primary DMA controller; and
    at the on-chip interconnect, implementing the control logic to convey the read request from the primary DMA controller to the source memory device in response to the primary DMA controller receiving the synchronization request.

13. The method of claim 12, further comprising, at the on-chip interconnect, synchronizing respective memory caches of the on-chip destination memory devices by writing the data included in the read response to the on-chip destination memory devices.

14. The method of claim 11, further comprising, at the on-chip interconnect
    conveying the read response to a proper subset of the plurality of DMA controllers.

15. The method of claim 14, wherein the read request indicates the proper subset of the plurality of DMA controllers to which the read response is conveyed.

16. The method of claim 11, wherein:
    the integrated circuit further includes a respective plurality of processing devices communicatively coupled to the plurality of DMA controllers;
    the read response further includes processing setting metadata that indicates a preprocessing operation; and
    the method further comprises, at the respective processing devices, applying the preprocessing operation to the data included in the read response prior to writing to data included in the read response to the destination memory devices.

17. The method of claim 16, wherein the preprocessing operation is a compression operation or an encryption operation.

18. The method of claim 11, wherein the pointer addresses are included in respective headers of the copies of the read response.

19. An integrated circuit comprising:
- a plurality of direct memory access (DMA) controllers;
- a respective plurality of processing devices communicatively coupled to the plurality of DMA controllers; and
- an on-chip interconnect configured to implement control logic to:
  - convey a read request from a primary DMA controller of the plurality of DMA controllers to a source memory device; and
  - broadcast or multi-cast a read response by conveying respective copies of the read response from the source memory device to the primary DMA controller and one or more secondary DMA controllers, each of the primary DMA controller and one or more secondary DMA controllers having a corresponding on-chip destination memory device included in the integrated circuit;
  - control the processing devices to apply a preprocessing operation to data included in the read response; and
  - control the primary DMA controller and the one or more secondary DMA controllers to write the data included in the read response to corresponding on-chip destination memory devices associated with the respective primary and secondary DMA controllers subsequently to applying the preprocessing operation.

20. The integrated circuit of claim 19, wherein the preprocessing operation is a compression operation or an encryption operation.

* * * * *